Figure 1:
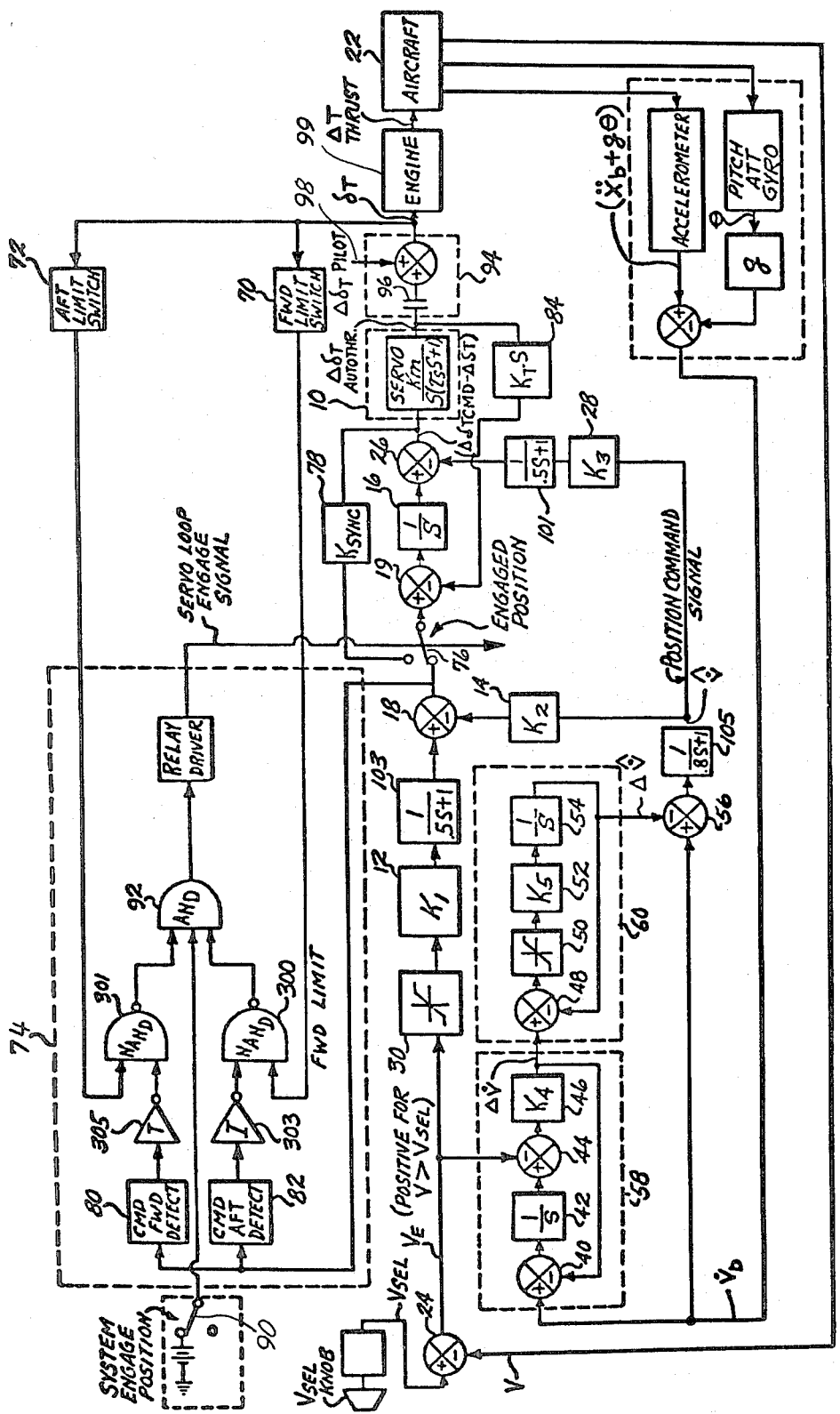

United States Patent [19]

Stephan

[11] 4,212,444

[45] Jul. 15, 1980

[54] GUST BIAS SIGNAL-GENERATING CIRCUIT FOR AIRCRAFT THROTTLE CONTROL SYSTEM

[75] Inventor: Leonard P. Stephan, Seattle, Wash.

[73] Assignee: The Boeing Company, Seattle, Wash.

[21] Appl. No.: 853,952

[22] Filed: Nov. 22, 1977

[51] Int. Cl.² ............................................. G05D 1/08
[52] U.S. Cl. ................................ 244/182; 73/178 R; 244/188; 340/27 SS; 364/431
[58] Field of Search ......................... 73/178 R, 178 T; 244/181, 182, 188, 191; 340/27 R, 55; 364/431, 440, 442, 435

[56] References Cited

U.S. PATENT DOCUMENTS 3,662,976   5/1972   Gesler ................................. 244/182
3,814,912   6/1974   Manke et al. ................. 340/27 SS X
3,955,071   5/1976   Lambreets ........................ 244/182 X Primary Examiner—Stephen G. Kunin
Attorney, Agent, or Firm—Conrad O. Gardner; B. A. Donahue

[57] ABSTRACT

A system for processing signals representative of airspeed error and inertial longitudinal acceleration in first and second channels, respectively, and providing cancellation of the turbulence-induced components of the respective signals. Shear detection and compensation circuits are provided in the system for reducing speed wandering in moderate and heavy turbulence. A circuit processing the signal $\Delta \dot{V}$ from the shear detector circuit is utilized to provide a gust bias signal input in the system.

3 Claims, 2 Drawing Figures

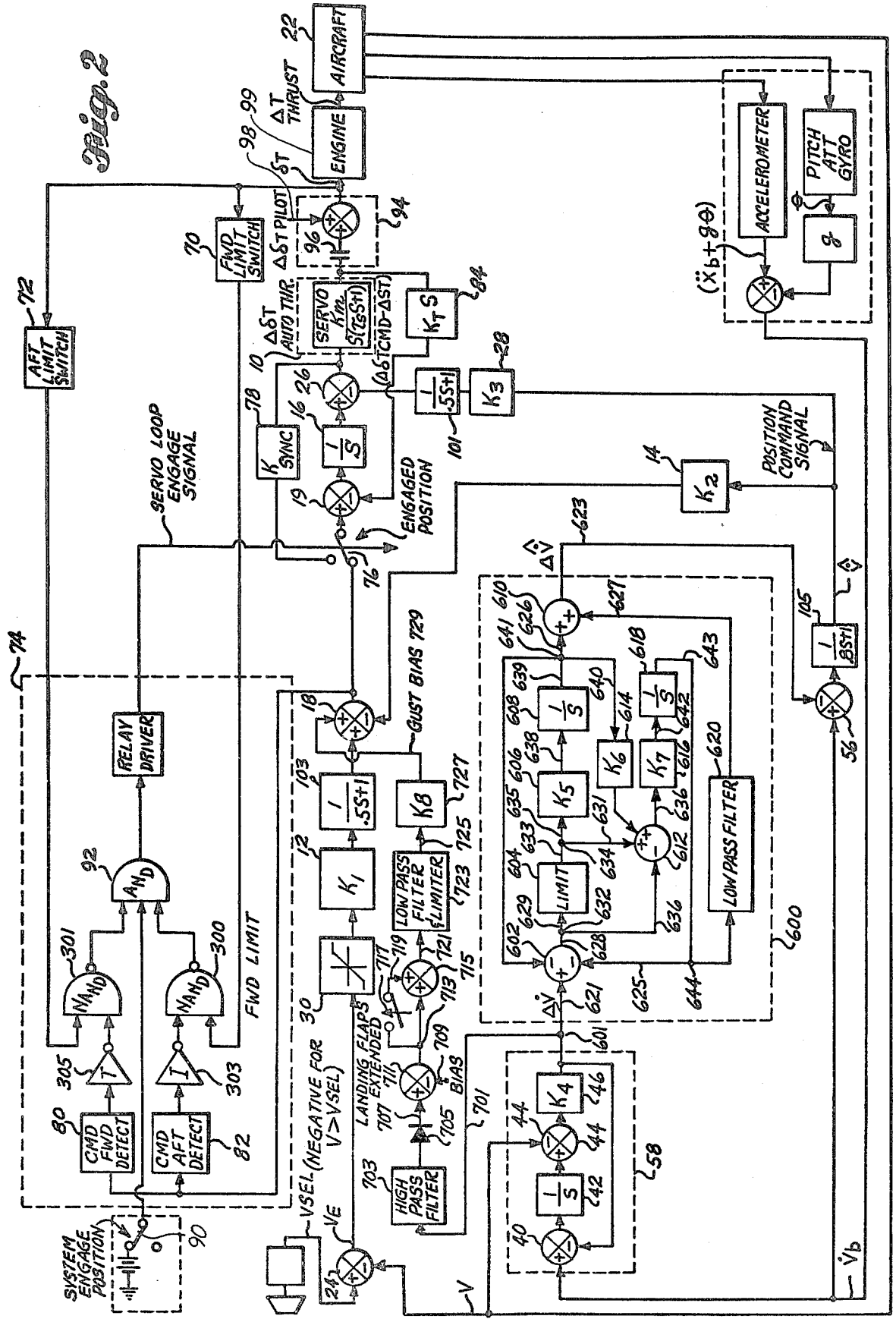

GUST BIAS SIGNAL-GENERATING CIRCUIT FOR AIRCRAFT THROTTLE CONTROL SYSTEM

This invention relates to throttle control systems for aircraft and more particularly to throttle control systems including shear detection and compensation.

Prior art throttle systems such as shown in U.S. Pat. No. 3,840,200 to Lambregts, assigned to The Boeing Company, have provided windshear detection and compensation; however, the aforementioned system included shear detection and compensation circuits which rejected information herein discovered to be useful in the reduction of speed wandering of the aircraft in moderate and heavy turbulence.

It is accordingly an object of this invention to provide a circuit for detecting windshear and providing a windshear compensation signal in which signal information contained in rejected portions of a limiter in the circuit is retained and processed in a manner providing reduced aircraft wandering in moderate and heavy turbulence.

It is yet another object of this invention to provide circuit means coupled to a shear detector circuit for rectifying the high frequency content of the output and filtering the excess above a bias value to provide a gust bias signal for increasing the speed of the aircraft above crew selected speed.

Further objects, features, and advantages of the invention will readily become apparent from the following specification and from the drawings, in which:

FIG. 1 is a schematic diagram of the system shown in FIG. 5 of U.S. Pat. No. 3,840,200, representative of the prior art; and, FIG. 2 is a system circuit embodiment of turbulence-compensated throttle control system in accordance with the present invention.

Turning now to FIG. 1 (and FIG. 5 of U.S. Pat. No. 3,840,200 corresponding thereto) denoted PRIOR ART, it will be noted that this complete schematic diagram of prior art throttle control system including turbulence compensation utilizes shear detection and compensation as provided by circuits 58 and 60 to provide the wind shear correction signal component ($\Delta \dot{V}$). FIGS. 3, 4 and 5, as well as the accompanying description thereof found in aforereferenced U.S. Pat. No. 3,840,200, may be referred to for a clear understanding of the system and particularly the attendant philosophy involved in the evolution of shear detection and compensation circuits 58 and 60. It is believed that such will aid in providing a clear understanding and appreciation of how the signal ($\Delta \dot{V}$) output from washout and lag circuit 58 is generated and therefore how it can be utilized at lead 701 (as seen in FIG. 2) and processed to provide gust bias signal 729 as hereinafter described. Such an understanding will further facilitate comparison and appreciation of the features and advantages of circuit 600 of FIG. 2 when compared to those of rate limited lag circuit 60 of FIG. 1.

Briefly, considerations in the design of the shear detector circuit having low sensitivity of turbulence comprising circuits 58 (of FIGS. 1 and 2,) and 60 (of FIG. 1) for providing the correction term $\Delta \dot{V}$ to be subtracted from $\dot{V}_b$ are now noted. In this connection a single complementary washout and lag type filter having a time constant of 10 seconds provided adequate windshear performance. This allows $\Delta \dot{V}$ to be built up with a rate of 0.1 knot per second$^2$ for a step input of 1 knot per second. The rate limit for limiter circuit 50 in the rate limited lag circuit 60 (of FIG. 1) may therefore be set at 0.1 knot per second$^2$ for a loop gain $K_5$ of 0.1. A further consideration affects the selection of the values of gains $K_4$, $K_5$, of amplifier circuit means 46 and 52 respectively and the rate limit of limiter circuit 50 in the system of FIG. 1. The smaller the rate limit selected, and the higher gain value $K_4$ that is chosen, the higher percentage of time the rate limit circuit 50 will be saturated by turbulence, thus preventing the development by circuits 58 and 60 of a signal $\Delta \dot{V}$ to be subtracted from the signal $\dot{V}_b$ to provide a signal $\dot{V}$ representative of longitudinal acceleration which is corrected for windshear. Shear detection and compensation as provided by circuits 58 and 60 coupled between the $V_E$ signal channel and the $\dot{V}_b$ signal channels would in such a case be adversely affected by the level of turbulence. This is minimized in the system design of FIG. 1 by selecting $K_4=5$, $K_5=0.2$ knots per second$^2$. These values sufficiently suppress turbulence response of the shear detector circuit and do not deteriorate the turbulence immunity of the autothrottle control system. The shear detector utilizes as an input, the air speed error signal $V_E$ without affecting autothrottle system performance for step changes in air speed. For a step introduction of a 1.0 knot per second windshear in smooth air, the peak value of air speed error remains limited to about 4 knots.

In FIGS. 1 and 2 a further advantageous feature of the rate command type autothrottle systems should be noted in the mode of operation occurring when either the forward or aft throttle limit position is reached. When either of these two autothrottle conditions is detected by the closing of one of throttle limit switches 70 or 72, autothrottle limit logic circuit 74 generates at the output thereof a servo loop disengage signal causing switching means 76 to close a signal path including synchronizing amplifier 78 from the output of adder 26 back to the input of adder 19, thereby synchronizing the total servo command input to servo means 10 to zero. The autothrottle control systems are reengaged subsequently when the sum $K_1V_E+K_2\dot{V}$ changes sign (polarity from zero). Sign detector circuit 80 or 82 detect the positive or negative polarity change respectively of this sum as provided at the output of adder circuit 18. This circuitry to provide anticipation of throttle command to drive the throttle out of the limit position is therefore proportional to $\dot{V}$, as required to provide capture of the selected speed $V_{SEL}$ asymptotically. The total servo position error, ($\delta T_{CMD}-\Delta\delta T$) is synchronized to zero when switching circuit 76 is in the disengaged position to insure that the servo 10 comes out of the limit position without a step transient. Such a step transient could occur due to the presence of the position command signal proportional to acceleration coupled through amplifier 28 and present as an input to adder 26, if this signal was not zeroed by the synchronization loop. Switching means 76 is driven to the engage position when the output of AND circuit 92 is high, which requires that the system engage switch 90 is engaged and both outputs of circuit 301 and 300 are high.

The output of circuit 300 is normally high except when circuit 70 is high, signifying that the forward throttle limit is reached and circuit 82 is low, further signifying that there is no command to drive the throttles aft, so that in this case both inputs to circuit 300 are high and the output of circuit 300 is low. The output of circuit 301 is normally high except when circuit 72 is high, signifying that the aft throttle limit is reached and circuit 80 is low, further signifying that there is no command to drive forward, so that in this case both input to circuit 301 is high and the output of circuit 301 is low.

The gain value for K sync amplifier 78 determines how fast the position error is nulled out. For a gain factor of 10 the position error goes to zero in less than 1 second.

The feedback loop for the position servo 10 comprises tachometer means 84 coupled from the output of servo 10 back to an input of adder circuit 19. If the servo motor 10 rotates at a given rate, then the throttle position $\delta_T$ is a ramp function. Mathematically the change in throttle position $\Delta\delta_T$ is the integration of the servo or throttle rate, that, $\Delta\delta_T = \Delta_T/S$. The tachometer 84 is actually a generator which produces a signal proportional to the angular velocity of the motor 10 or proportional to the differentiated throttle position that is $\dot{\delta}_T = S\delta_T$. Throttle position as the feedback signal is obtained using the tachometer signal $K_T S\delta_T = K_T\dot{\delta}_T$, which is then integrated in circuit 16 yielding $K_T/S\delta_T = K_T\Delta\delta_T$, thereby providing an output signal proportional to the actual position change $\Delta\delta_T$ utilized to cancel the throttle position command signal $\Delta\delta_T$CMD at adder circuit 26. The servo 10 therefore sees a signal outputted from adder 26 which is proportional to the difference of throttle position command provided in the systems of FIGS. 1 and 2 in accordance with the autothrottle control law of these systems and the signal representative of actual throttle position change $\Delta\delta_T$. The throttle servo motor 10 will therefore run with an angular velocity proportional to the position error of the throttle 94 and come to a stop only when true position error has reached zero.

The servo motor 10 drives the throttle means 94 through a clutch means 96 which is normally engaged. The throttle levers indicative of throttle position 98 control the amount of fuel passing to engine 99. When the pilot applies a force to the throttle levers denoted $\Delta\delta_T$pilot, clutch means 96 disengages so that the throttle servo 10 no longer drives the levers. This allows the pilot to take over throttle control at any time.

As hereinbefore mentioned, the improved system of FIG. 2 includes shear detection and compensation circuits 58 and 600 which provide the windshear compensation signal $\Delta\dot{V}$. In shear detection circuit 58 of FIG. 2 it should be noted that the second input to combining circuit 44 comprises a signal representative of airspeed rather than airspeed error, as in the circuit 58 of the system of FIG. 1. In compensation circuit 60 of the system of FIG. 1, limiter circuit 50 rejected signal information exceeding the limits, thereby causing speed wandering in moderate and heavy turbulence, the wandering being directly related to the asymmetry between positive and negative peaks of the signal outside the limits. Compensation circuit 600 in contrast retains signal information over the limit (signal 631 minus signal 636) providing amplification thereof with a gain $K_7$ in amplifier circuit means 616 and subsequent integration in integrator circuit 618 as limited signal 633 is also similarly processed with a gain $K_5$ in amplifier circuit means 606 and subsequently integrated in integrator circuit 608. The path for signal 640 with a low gain $K_6$ through amplifier circuit means 614 to combining circuit means 612 provides equalizing with no dynamic significance. Signal path splitting is thus seen in circuit 600 wherein the signal within the limits of limiter circuit 604 is filtered slightly for rapid system response, whereas the signal path outside the limits provides heavier filtering for noise rejection.

In moderate or heavy turbulence signal 643 is very noisy and is attentuated by low pass filter circuit 620 prior to being added as signal 627 in combining circuit 610 to provide signal 623 representative of $\Delta\dot{V}$.

More specifically, in the present turbulence-compensated throttle control system of FIG. 2 shear detection and compensation are provided by washout and lag circuit 58 and compensation circuit 600 where input signal 621 representative of $\Delta\dot{V}$ which is provided at output terminal 601 of washout and lag circuit 58 is coupled to a first input of first combining circuit 602. The output signal 628 at output terminal 632 of combining circuit 602 is coupled through a first signal path 629 to limiter circuit 604 and through a further signal path 636 to a first input of second combining circuit 612. Output signal 633 from limiter circuit 604 is coupled through a signal path 631 as a second input to second combining circuit 612 and also through signal path 635 to amplifier circuit 606. The output of amplifier circuit 606 is coupled through signal path 638 to integrator circuit 608, the output path 639 of integrator circuit 608 being coupled through terminal 641 to provide a first input signal 626 to third combining circuit 610. Signal path 640 coupled from terminal 641 through amplifier circuit 614 provides a third input to second combining circuit 612 and the hereinbefore discussed equalizing path in the particular type signal processing provided by circuit 600. Output signal path 636 from second combining circuit 612 is connected in series circuit path through amplifier circuit 616 and integrator circuit 618 to common terminal 644, common terminal 644 being connected to a third input terminal of first combining circuit 602 and further connected to low pass filter circuit 620 for providing signal 627 containing useful data information outside the limits of limiter 604 as a second input to third combining circuit 627. Output signal 623 (representative of $\Delta\dot{V}$) from third combining circuit 610 is coupled to an input of combining circuit 56 in the system of FIG. 2 to provide the shear-corrected signal as was the signal $\Delta\dot{V}$ in the system of FIG. 1.

A further feature hereinbefore referred to in the system of FIG. 2 comprises the circuit path coupled between output terminal 601 of washout and lag circuit 58 and an input of adder circuit 18 for providing gust bias signal 729 to increase speed with increasing level of turbulence. The signal $\Delta\dot{V}$ representative of air mass motion with respect to the ground varies rapidly in turbulence and is coupled from output terminal 601 through high pass filter 703 to rectifier 705 so that the high frequency components of the aforesaid signal are rectified and subsequently coupled through combining circuit 711 so that values exceeding bias level 709 are provided at terminal 713 and a first input terminal of combining circuit 715 and appear as input signals 721 to low pass filter and limiter circuit 723 having limits of zero and about ten knots, thereby limiting the amount of "fly fast" command imparted at combining circuit 18 of the throttle control system of FIG. 2. Signal output 725 from low pass filter and limiter circuit 723 is then coupled through amplifier circuit 727 to an input of adder circuit 18. Normally open switching means 717 connected between terminal 713 and circuit path 719 to a second input of combining circuit 715 is closed upon extension of landing flaps in landing configuration of the aircraft, thereby causing a doubling in amplitude of gust bias signal 729 for providing an increased speed margin in the case of turbulence during landing.

I claim:

1. In combination:

a shear detector circuit responsive to signals representative of airspeed and longitudinal acceleration for providing an output signal; and gust bias signal-generating means responsive to said output signal for providing a gust bias signal representative of increased level of turbulence, means for limiting the fly fast command provided by said gust bias signal to about 10 knots, said gust bias signal-generating means including switching means responsive to landing flap extension for doubling the amplitude of said gust bias signal in the event of turbulence during landing.

2. A circuit for generating a speed command signal for an aircraft comprising:

means for providing a signal $\Delta \dot{V}$ representative of air mass motion with respect to the ground;

high pass filter circuit means responsive to said signal $\Delta \dot{V}$ representative of air mass motion with respect to the ground, said high pass filter circuit means having an output terminal; and a rectifier, a low pass filter and limiter, and an amplifier circuit connected in series circuit path downstream from said output terminal for providing said speed command signal.

3. The circuit of claim 2 further including circuit means in said series circuit path for increasing the amplitude of said speed command signal when the aircraft is in a landing configuration.

* * * * *